UNITED STATES PATENT OFFICE.

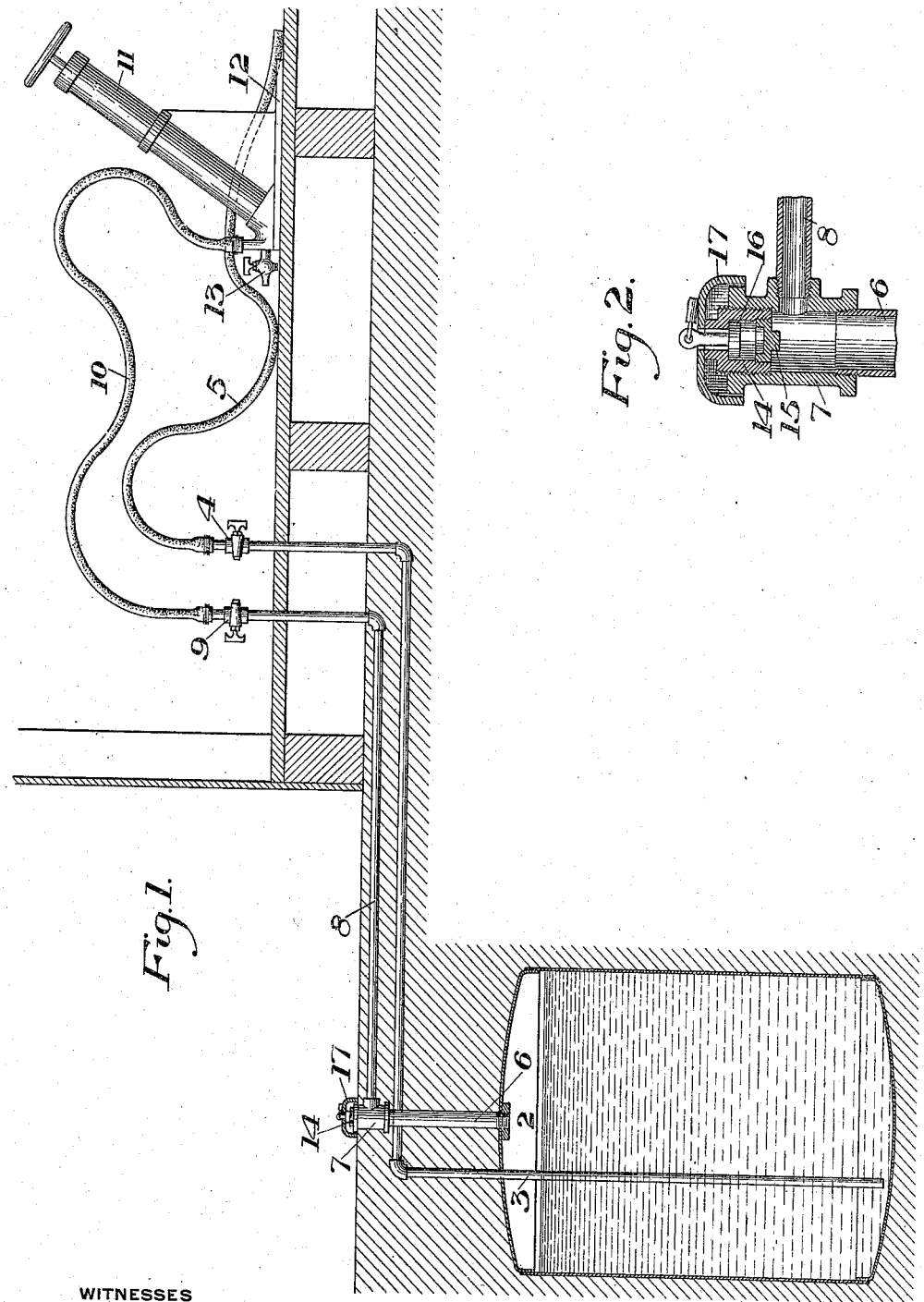

HORACE E. GRANT, OF PITTSBURG, PENNSYLVANIA.

STORAGE GASOLENE APPARATUS.

939,596.  Specification of Letters Patent.  Patented Nov. 9, 1909.

Application filed July 20, 1907. Serial No. 384,767.

*To all whom it may concern:*

Be it known that I, HORACE E. GRANT, of Pittsburg, Allegheny county, Pennsylvania, have invented a new and useful Storage Gasolene Apparatus, of which the following is a full, clear, and exact description, reference being had to the accompanying drawings, forming part of this specification, in which—

Figure 1 is a sectional side elevation showing one form of my improved apparatus; and Fig. 2 is a detail sectional view of the T-fitting.

My invention relates to storage apparatus for gasolene or similar fluids, such as used in automobiles, engines, &c.

The object of the invention is to provide a simple and effective system which is not liable to get out of order, and by which the gasolene may be forced to the desired point by the operator in any desired quantities.

A further object is to enable the outlet to be shifted to different points, depending upon the position of the car or other tank or receptacle to be filled.

In the drawing, 2 represents the storage tank proper, which is preferably buried in the ground, and provided with a gasolene outlet pipe 3 extending from near its bottom up through the top and thence preferably under the ground to a position below the floor of the stable or house, and thence extended upwardly to above the floor and fitted with a cock 4. To the cock fitting is connected a flexible hose 5, which may be shifted about on account of its flexibility so as to direct the gasolene to the desired point. The end of this hose may be provided with any suitable nozzle, if desired.

A pipe 6 is led from the top of the gasolene tank upwardly to the surface of the ground, where it is preferably provided with a T-shaped fitting 7 from which an air pipe 8 leads preferably below the ground level to a point below the floor, and thence up to a cock 9. From the cock 9 a flexible tube or hose 10 extends to a small portable air-pump 11, which preferably has a foot attachment 12, so that it may be held by the foot of the operator while actuating the pump to force the gasolene into the receptacle. The fitting which connects the hose 10 to the pump is preferably provided with a pet cock 13. The upper branch of the T-shaped fitting 7 is provided with a closing plug, which is normally closed and locked, and through which the tank may be filled with gasolene. In order to lock this plug and at the same time provide an air-tight fitting, I preferably internally screw-thread the upper branch of the T and screw into this a hollow screw-plug 14, which is provided with a vertical hole of two diameters, the lower end being closed by a plug 15. Within this recess is located a swivel nut 16, which can turn freely within the plug, and is provided with an eye at its upper end to receive a padlock. Surrounding the plug is a cap 17, which may be turned without unscrewing the plug 14 when the padlock is removed. When the padlock is in place and locked, the plug cannot be removed.

In using the apparatus, the cocks 4 and 9 are open and the pet cock 13 is closed. The end of the hose 5 is then placed in the strainer of the car tank if an automobile is to be filled, and the operator having placed the hand pump adjacent to the hose 5 operates the pump with one hand while he holds the hose 5 with the other hand. He thus pumps sufficient air into the gasolene tank to start a flow through the hose 5. After this flow starts an occasional stroke of the pump will keep up the flow until the desired quantity is drawn. The pet cock 13 is then turned, allowing the air to escape from the tank; and this will produce a suction which draws the gasolene back into the tank from the pipe 3 and the hose 5. The cocks 4 and 9 are then closed, thus hermetically sealing the gas in the tank.

The advantages of my invention result particularly from the movable or portable pump with its flexible connection; and also from the movable end portion or flexible connection for the outlet pipe within the building. The operator can thus force the oil to flow, and can regulate the flow or stop it as desired, while holding the outlet pipe at the desired point. The locked plug gives a convenient means for filling the tank, while preventing meddling.

Variations may be made in the form and arrangement of the tank, connections, special pump used, &c.; jointed pipes may be used instead of flexible hose, and other variations may be made without departing from my invention.

I claim:—

1. In a gasolene storage apparatus, a tank having an outlet pipe, an air pressure pipe leading to the tank, a pump connected to the end of the air pipe, and a release valve connected to the air pressure pipe and arranged to release the pressure therein, said valve being accessible from the operator's position of the pump, substantially as described.

2. In a gasolene storage apparatus, a storage tank, an outlet pipe therefor having a movable end portion, an air pressure pipe leading to the tank and having a flexible connection with a portable air pump, and a release valve connected to the air pressure pipe and arranged to release the pressure therein, said valve being accessible from the operator's position at the pump, substantially as described.

3. In a gasolene storage apparatus, a storage tank, an outlet pipe and an air supply pipe therefor, both provided with cocks, a portable air pump having flexible connection with the air pressure pipe, and a release valve connected to the air pressure pipe and arranged to release the pressure therein when it is desired to stop the flow, said valve being accessible from the operator's position at the pump, substantially as described.

4. In a gasolene storage apparatus, a storage tank, an outlet pipe and an air supply pipe both provided with cocks, a portable air pump having flexible connection with the air pressure pipe, and a pet cock connected to the air pressure pipe arranged to allow the air pressure to escape; substantially as described.

5. In a gasolene storage apparatus, a tank having a gasolene outlet pipe and an air pressure pipe, flexible pipes connected to the ends of said pipes, a portable air pump connected to one of the pipes, and a valve arranged to release the pressure in the air pressure pipe, said valve being at the pump end of the flexible pipe, substantially as described.

6. In a gasolene storage apparatus, a buried tank having a supply pipe provided with a filling plug, an outlet pipe, a locking device for the plug, an air-pressure pipe leading to the tank, the air pressure pipe and outlet pipe being provided with hand cocks near the point of use, flexible end portions for the two pipes, and a portable air pump connected to the air-supply pipe and having a pet cock arranged to release the air pressure; substantially as described.

7. In a gasolene storage apparatus, a tank having an outlet pipe, a fill pipe, and a pump connected to the fill pipe, substantially as described.

8. In a gasolene storage apparatus, a tank having an outlet pipe, a fill pipe having a T-shaped fitting, a removable closure for one branch of the fitting, and a pump connected to the other branch of the fitting, substantially as described.

In testimony whereof, I have hereunto set my hand.

HORACE E. GRANT.

Witnesses:
 LAURENCE H. LEE,
 H. M. CORWIN.